UNITED STATES PATENT OFFICE.

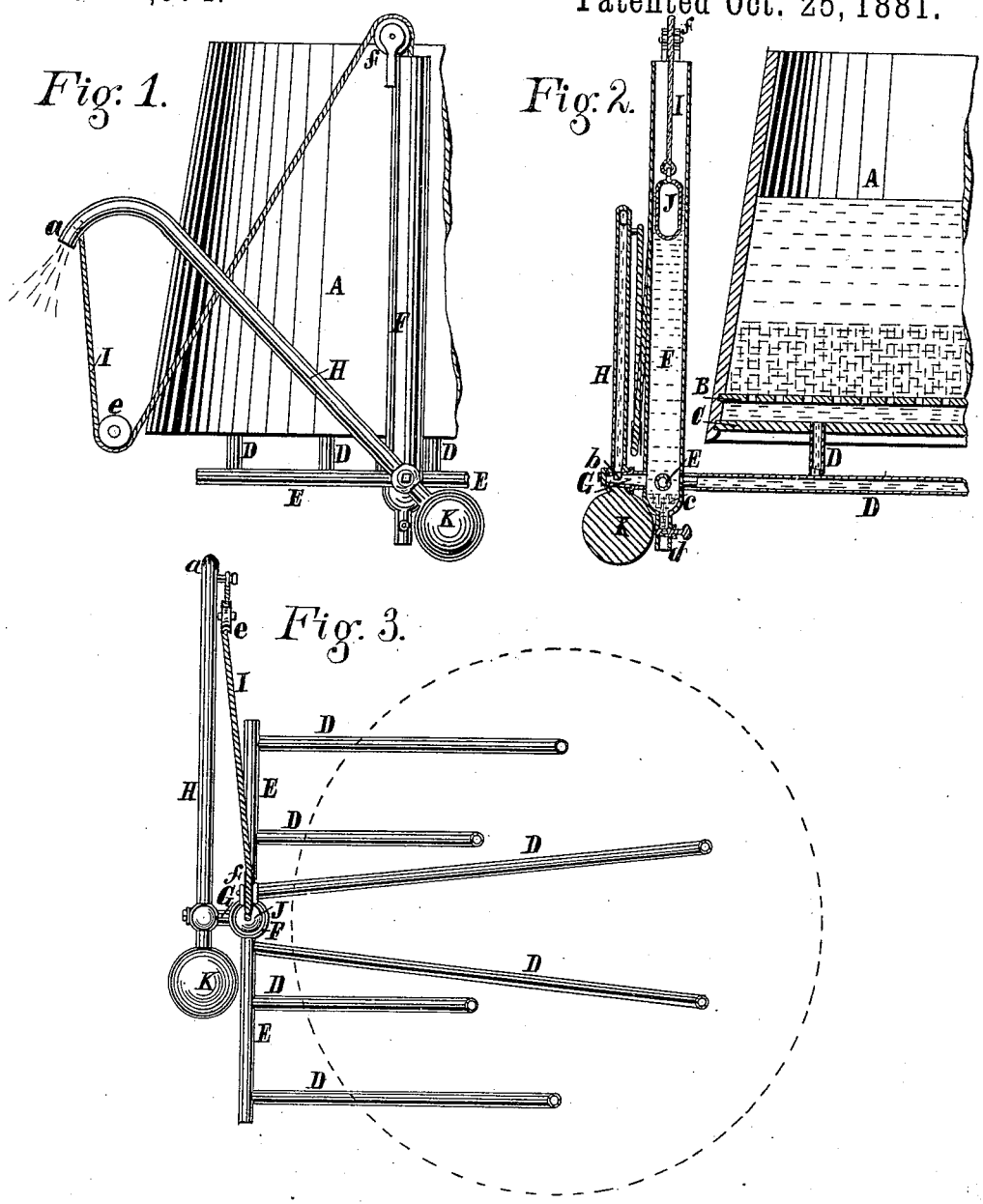

GOTTLIEB F. BURKHARDT, OF BOSTON, MASSACHUSETTS.

FILTER.

SPECIFICATION forming part of Letters Patent No. 248,574, dated October 25, 1881.

Application filed May 14, 1881. (No model.)

*To all whom it may concern:*

Be it known that I, GOTTLIEB F. BURKHARDT, a citizen of the United States, residing at Boston, in the county of Suffolk and State of Massachusetts, have invented a new and useful Improvement in Filters, of which the following is a specification, reference being had to the accompanying drawings.

My invention relates to a pipe or conduit in combination with a mash-tub or other tank having a strainer therein, said pipe receiving the liquid from below said strainer, and being adjustable, to bring the orifice or outlet for said liquid at different elevations, in order that the liquid may be drawn from the tank at or near the level of the surface of the liquid in the tank for the purpose of preventing too rapid flow of the liquid and consequent packing of the thick part of the mash or other mixture against the strainer, or forming of channels in the mash, to render the filtration incomplete.

This my invention consists in a pipe or conduit which, receiving the liquid from the tank below the strainer at or near one end, may swing at or near this end to bring the outlet-orifice at the other end at different elevations; and it further consists in a float, together with suitable mechanism for connecting the same, in combination with the movable pipe having the outlet-orifice for automatically regulating the position of said movable pipe.

In the drawings, Figure 1 is a front elevation of so much of an apparatus embodying my invention as serves for illustration of the same. Fig. 2 is a section taken at right angles to the plane of Fig. 1. Fig. 3 is a plan of the pipes, the dotted line indicating the position of base of the tank.

In the tank A is a strainer, B. There is a space between the strainer B and bottom C of the tank. Pipes D, as many as are necessary, lead from the bottom of the tank to horizontal pipes E. Leading from the pipes E or from the vertical pipe F, as shown, is a pipe, G. On the pipe G, to swing thereon, is pivoted a pipe, H. At the upper or outer end of the pipe H is the outlet-orifice a. The opening b, from pipe G to pipe H, is such that a free passage is open from one to the other when the pipe H is in any position from a vertical to a horizontal position, swinging in the direction indicated. The stand-pipe F is connected to pipes E and pipe G near its lower end, but extends somewhat below these pipes to leave a space or form a receptacle, c, useful for collecting sediment. There is a stop-cock, d, at the lower end of pipe F or receptacle c, for the purpose of letting out all the liquid from the pipes and tank when needed for cleansing or like purposes.

To the pipe H is connected at a suitable point a rope, I, or chain, which, passing about suitable pulleys, e and f, is connected at the other end to a float, J, in stand-pipe F.

To the lower end of pipe H is joined a weight, K, which should be of sufficient size and in proper position with reference to place of pivoting this pipe to somewhat more than counterbalance the pipe H and the liquid therein when the pipe is nearly or quite full.

The float J is of size and weight to float on the liquid in pipe F, but when not supported by the liquid to pull the end a of pipe H downward by means of the rope I, as will be readily understood.

After the necessary quantity of liquid has passed through the strainer B it will rise in the stand-pipe F to the height of the liquid in the tank. It will also rise in the pipe H, but the outlet a being brought to a lower position than the surface of the liquid in the tank and stand-pipe the liquid will flow therefrom; hence the filtration will continue and the liquid will lower in the tank and stand-pipe, and the float J, falling, will draw the end and outlet a downward, keeping this outlet a little below the surface of the liquid in the tank till the whole is drawn therefrom. Consequently the flow will be such as is the result of slight pressure, not causing the thick or solid part of the mash or other mixture to clog the strainer nor forming channels in the same, but allowing complete saturation, and, as the ultimate and much desired result, the most perfect filtration.

The float is placed in a stand-pipe or reservoir separate from the tank, for holding the liquid after it has passed through the strainer, for the reason that the thick part of the mash or other mixture will not allow a float to sink therein to the extent of the drainage of the liquid therefrom, though the mixture may in some cases contain so little solid matter that the float may be located in the tank and serve its purpose, and in such cases the stand-pipe would, of course, be unnecessary.

I claim as my invention—

1. In combination with a tank having a strainer therein, a pipe connected to said tank to receive the liquid therefrom, and pivoted to swing so as to bring an outlet-orifice at different elevations, substantially as and for the purpose set forth.

2. A pipe connected to a tank to receive liquid from the tank below a strainer therein, and movable so as to bring an outlet-orifice at different elevations, the movement of said pipe being controlled by a float operated by the liquid in said tank, or in a stand-pipe or reservoir connected therewith, substantially as and for the purpose set forth.

3. The combination of tank A, having strainer B, pipes D, pipes E, and swinging pipe H, substantially as specified.

4. The combination of tank A, strainer B, pipes D and E, swinging pipe H, and float J, substantially as and for the purpose specified.

5. The combination of tank A, having strainer B, stand-pipe F or reservoir, swinging pipe H, with suitable connecting pipes or conduits, float J, with suitable connecting mechanism of rope or chain and pulleys, substantially as specified.

GOTTLIEB F. BURKHARDT.

Witnesses:
 EDW. DUMMER,
 W. H. SOLOMON.